Sept. 14, 1943.   E. F. McDONALD, JR   2,329,634
RADIO APPARATUS
Original Filed Oct. 6, 1939   4 Sheets-Sheet 1

INVENTOR
EUGENE F. McDONALD, JR.
BY
Bacon & Thomas
ATTORNEYS

Sept. 14, 1943.    E. F. McDONALD, JR    2,329,634
RADIO APPARATUS
Original Filed Oct. 6, 1939    4 Sheets-Sheet 2
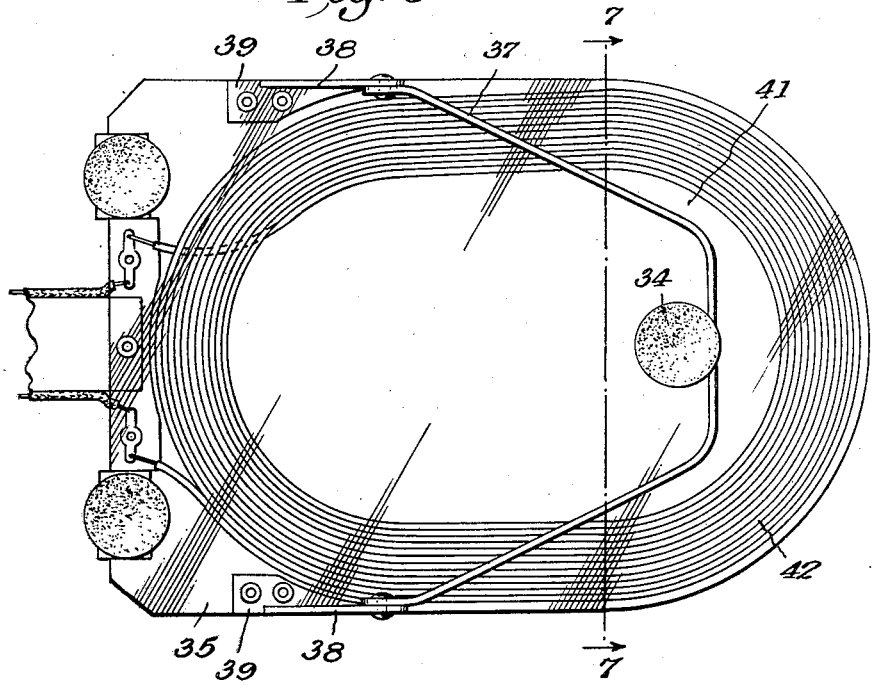
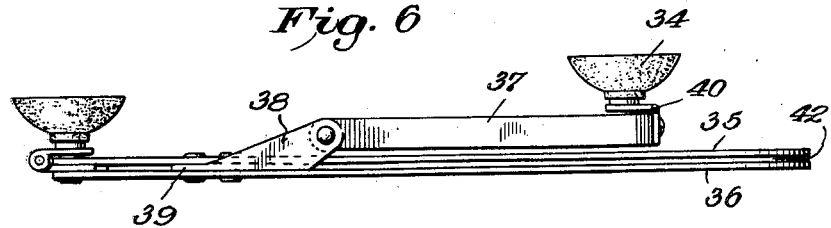
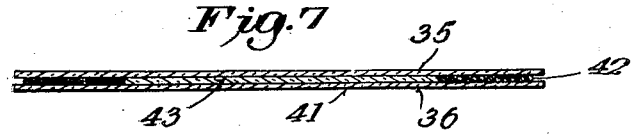
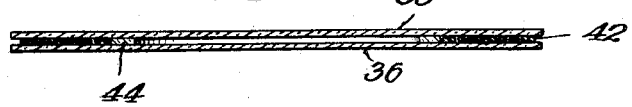
INVENTOR
EUGENE F. Mc DONALD, JR.
BY
Bacon & Thomas
ATTORNEYS Sept. 14, 1943.　　　E. F. McDONALD, JR　　　2,329,634
RADIO APPARATUS
Original Filed Oct. 6, 1939　　　4 Sheets-Sheet 3
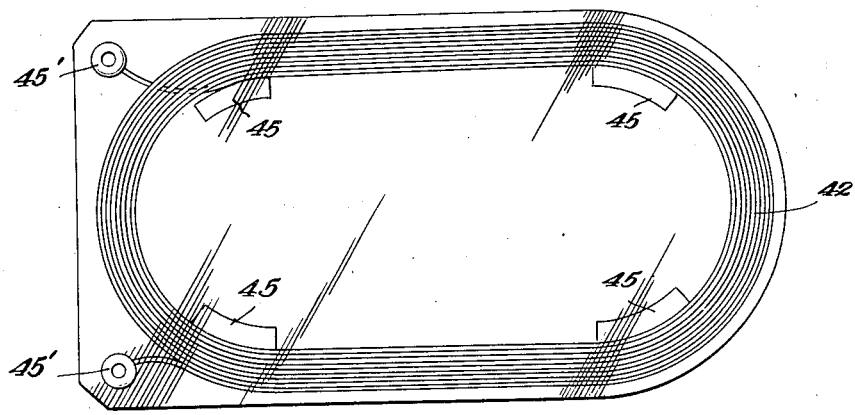
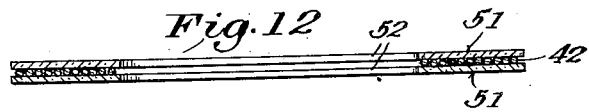
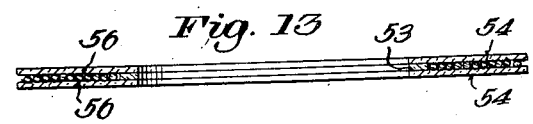
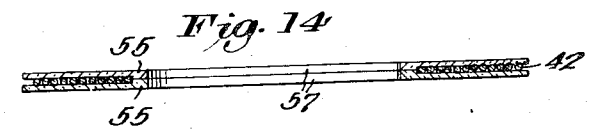
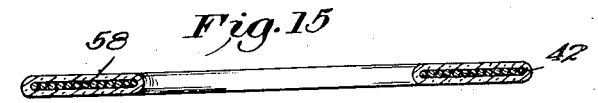
INVENTOR
EUGENE F. McDONALD JR.
BY
Bacon & Thomas
ATTORNEYS Sept. 14, 1943.  E. F. McDONALD, JR  2,329,634
RADIO APPARATUS
Original Filed Oct. 6, 1939  4 Sheets-Sheet 4
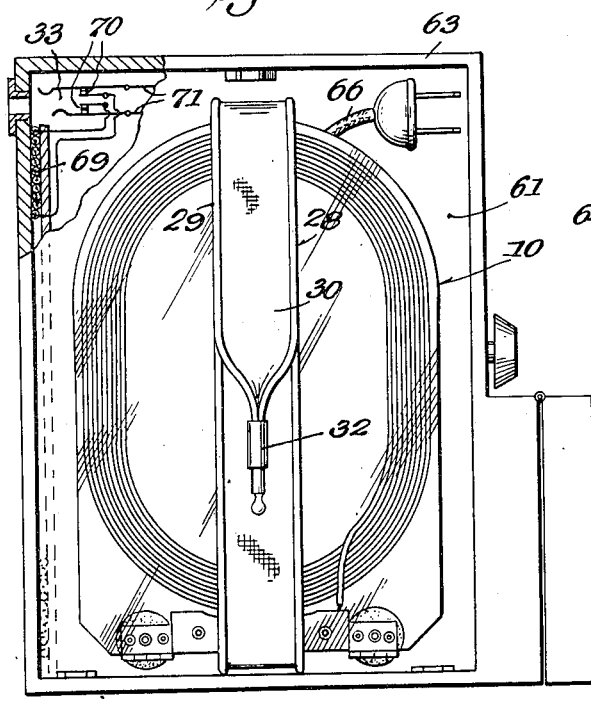
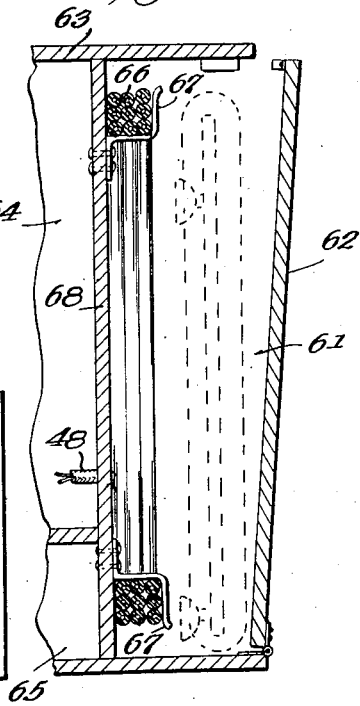
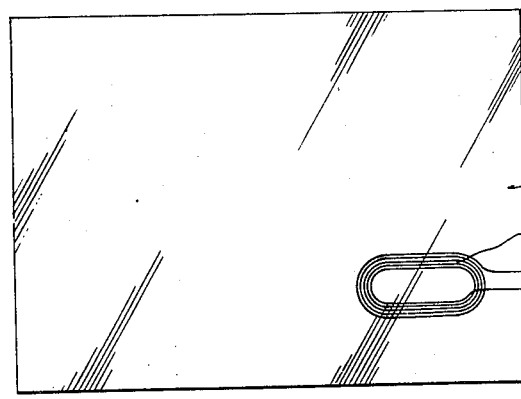
INVENTOR
EUGENE F. McDONALD, JR.
BY
Bacon & Thomas
ATTORNEYS Patented Sept. 14, 1943

2,329,634

UNITED STATES PATENT OFFICE 2,329,634

RADIO APPARATUS

Eugene F. McDonald, Jr., Chicago, Ill.

Original application October 6, 1939, Serial No. 298,302, now Patent No. 2,250,387, dated July 22, 1941. Divided and this application April 25, 1941, Serial No. 390,405

3 Claims. (Cl. 250—33)

This invention relates to radio apparatus, and more particularly to a small light weight antenna and the combination thereof with a radio set.

The invention is particularly useful in connection with portable radio receiving sets having self-contained batteries associated therewith, although the invention is applicable to sets operated from power lines. Many such sets have built-in antennae, and when positioned within shielding structures such as railroad cars, metal boats, automobiles, airplanes, or even certain types of buildings, insufficient signal energy reaches the antenna for satisfactory operation of the set. In my Patent No. 2,164,251, granted June 27, 1939, and entitled Portable radio receiver, I have described and claimed a radio set having an antenna which may be positioned in an opening, such as a window, in a shielding structure so as to provide for reception of radio signals when the set itself is positioned within a shielding structure. The present application constitutes an improvement over the structure claimed in said patent and also over the structure of my copending application Serial No. 281,297, filed June 26, 1939, now Patent No. 2,200,674, granted May 14, 1940, and entitled Radio apparatus.

The present invention relates particularly to a small light weight antenna structure which may be connected to a radio set and positioned in an opening in a shielding structure so as to markedly reduce impairment of vision through such opening. The antenna structure forming part of the present invention is preferably constructed largely of transparent materials or is of such size and configuration that an extremely small area of the opening is obstructed. For employment with portable radios the cases of such radios are preferably provided with a compartment for holding the antenna structure and for enabling the same to be removed from the case and supported apart from the set while connected thereto. The antenna is preferably provided with a flexible connector and also with attaching devices for enabling the antenna to be detachably secured to a surface in any one of a plurality of positions apart from the set. For permanent installation, the antenna structure may be permanently secured to such surface by adhesives or otherwise, or the supporting structure into which the wires constituting the antenna are incorporated may be extended to itself form a closure for an opening in a shielding structure, for example, the glass of an automobile or other window. In such permanent installation, it is preferred to provide a detachable connection between the antenna and the flexible conductor leading to the radio set.

An object of the invention is to provide a small light weight antenna structure particularly adapted to be positioned in an opening in a shielding structure without materially obstructing said opening.

Another object of the invention is to provide a rigid loop antenna structure including transparent material so as to provide for the passage of light through a major portion thereof.

Another object of the invention is to provide a radio set with an auxiliary antenna capable of being positioned in an opening in a shielding structure without materially obstructing said opening so as to enhance radio reception by a set positioned within such shielding structure.

Another object of the invention is to provide a radio set with both an auxiliary movable antenna and a built-in antenna so that connection of the auxiliary antenna to the set disconnects the built-in antenna.

A further object of the invention is to provide a radio set with a compartment for receiving a small light weight antenna so that the antenna may be removed from the set and positioned apart therefrom for enhancing reception of radio signals.

A still further object of the invention is to provide a loop antenna in which the conductors forming the loop are secured to or incorporated into a transparent panel to form a rigid antenna structure which does not materially obstruct vision therethrough.

Other objects and advantages of the invention will appear in the following description of the preferred embodiments shown in the attached drawings, of which:

Figure 5 is a view similar to Figure 1 of a modified antenna structure;

Figure 6 is a plan view of the structure of Figure 5;

Figure 7 is a sectional view taken on the line 7—7 of Figure 5 with the attaching means omitted;

Figure 8 is a similar view of a modified antenna structure;

Figure 9 is an elevation of another modified antenna structure;

Figure 10 is a view similar to Figure 7 showing a modified antenna structure adhesively secured to a supporting surface;

Figures 11 to 15 inclusive are views similar to Figure 7 showing still further modified antenna structures;

Figure 16 is an elevation of a window pane having an antenna coil incorporated therein;

Figure 17 is a side elevation of a radio set showing a compartment for an antenna in the end of the set casing with the door removed; and Figure 18 is a fragmentary vertical section of the structure of Figure 17 showing the compartment with the antenna structure in dotted lines.

Figure 1:
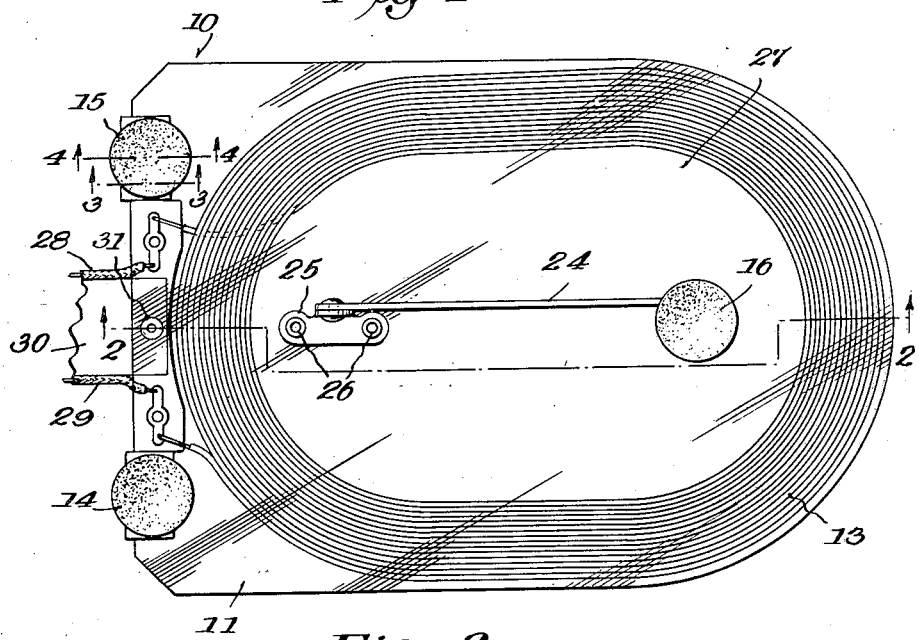
Figure 1 is an elevation of an antenna structure in accordance with the present invention.
Figure 2:
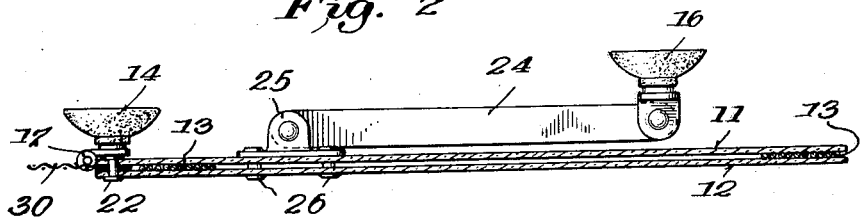
Figure 2 is a sectional view taken on the line 2—2 of Figure 1.
Figure 3:
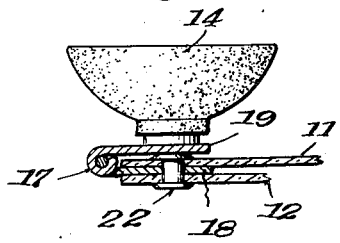
Figure 3 is a fragmentary section on a larger scale taken on the line 3—3 of Figure 1.
Figure 4:
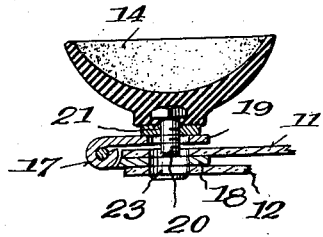
Figure 4 is a view similar to Figure 3 taken on the line 4—4 of Figure 1.

Referring to the drawings, and more particularly to Figures 1 to 4, 10 indicates, in general, an antenna structure in accordance with the present invention. The antenna structure 10 may include a pair of thin transparent plate members 11 and 12 between which is positioned a flat coil 13 constituting a loop antenna. To provide optimum electrical characteristics for reception, I have found that the conductors of the coil 13 should be positioned close together, should be of low resistance and separated by suitable insulation. The conductors of the loop may, for example, to be held in position by any suitable adhesive so as to also secure the transparent plates 11 and 12 together. The plates 11 and 12 may be provided with devices such as suction cups 14, 15 and 16 for quickly attachably and adjustably securing the antenna structure to a surface such as, for example, the glass of a window. As shown in Figure 3, the suction cups 14 and 15 are preferably hinged to one end of the antenna structure by means of hinges 17 having one leaf 18 extending between the panels 11 and 12 and the other end 19 secured to a suction cup, for example by means of a screw threaded stud 20 extending through a threaded aperture 21 in the leaf 19. The leaf 18 of the hinge 17 may be secured between the plates 11 and 12 by any suitable means, for example, rivets 22. An aperture 23 through the plates 11 and 12 and the leaf 18 of the hinge 17 may be provided for receiving the stud 20 when the hinge is in the position shown in Figures 3 and 4. The suction cup 16 is preferably pivotally secured to a link 24, which is in turn pivotally attached to the plates 11 and 12 by means of a bracket 25 secured to the plates 11 and 12, for example by rivets 26. The rivets 21 and 26 further constitute means for securing the plates 11 and 12 together and maintaining the conductors of the loop antenna 13 in position between the plates.

Although the conductors of the loop antenna 13 are opaque and render a portion of the aerial structure 10 opaque, a window portion 27 is provided in the center of the antenna structure. Thus, when the antenna structure is positioned in an opening, for example by attaching the same to a window glass, vision is permitted through the center of the antenna structure as well as around the edges thereof. The entire structure may be made small in size, for example, a structure approximately 9¼ x 6¼ inches, containing 27 turns of wire and providing a window portion approximately 6½ x 3¾ inches has been found to give satisfactory radio reception. Such a structure occupies only a small portion of the usual window found in shielding structures. Furthermore, the attaching means illustrated enables the antenna structure to be positioned parallel to the plane of the opening or at any desired angle thereto. In many cases a position at an angle to the plane of the opening provides satisfactory reception and in such cases even a smaller portion of the opening is obstructed. In most instances it is found that positioning the aerial structure in a corner of the opening will provide most effective reception. The corner of the opening giving best reception will depend upon the direction of the transmitter with respect to the opening. It has also been found that positioning only a portion of the antenna within the opening so that the remainder of the antenna is positioned back of the shielding structure surrounding the opening, many times increases reception over that obtained when the entire antenna structure is within the opening.

It is natural to think that a loop antenna constructed in accordance with my invention operates most satisfactorily when positioned farthest from the shielding structure, that is, when it is positioned centrally with respect to the opening in the shielding structure. It has, however, actually been found that such is not the case, but that when such a loop antenna is positioned centrally of the opening, a minimum of radio energy is received. Although the reason for this unexpected effect is not clearly understood, it is believed to be caused by the induction of a voltage in the loop by currents induced in the shielding structure, which forms a short circuited turn around the opening, and the two voltages induced in the loop, one from currents in the shielding structure and the other by direct induction from received radiation, are of such phase as to cancel almost entirely. When the loop is positioned off center with respect to the opening, much more voltage is induced in the loop than when it is positioned centrally, and it is believed that such off center positioning is effective to cause the two induced voltages in the loop to be less completely out of phase, with the result that they cancel each other less completely. At any rate, it is important that the loop antenna of my invention be positioned off center with respect to the center of an opening in a shielding structure near which the loop is placed.

It has also been found important to maintain the connecting wires leading from the antenna structure to the set in spaced apart position. An effective means for accomplishing this is to stitch the connecting wires 28 and 29 to the edges of a strip 30 of relatively stiff fabric. The fabric strip 30 is preferably secured to the antenna structure, for example, by inserting the end of the strip between plates 11 and 12 and riveting the same to the plates by means of a rivet 31. Such structure prevents strain from being applied to the conductors 28 and 29 and, as before mentioned, also maintains the conductors in spaced apart position. The strip 30 and conductors 28 and 29 constitute a flexible connection which, as shown in Figure 17, may terminate at its other end in a conventional plug 32 which is adapted to be received in a jack 33 as hereinafter more fully described.

A modified type of antenna is shown in Figure 5 which obstructs vision in a less degree than the antenna of Figures 1 and 2. The antenna structure of Figure 5 may be generally similar to that of Figure 1. Instead of employing a link to attach the vacuum cup 34 to the transparent plates 35 and 36, a yoke 37 is pivoted to brackets 38 which may have portions 39 extending between the transparent plates 35 and 36 and riveted thereto. The vacuum cup 34 may be attached to the yoke by means of a hinge 40 so that the antenna structure may be detachably secured to a surface in any one of a plurality of angular positions with respect thereto as well as parallel to the plane of the surface. It will be noted that the window portions 41 of the transparent plates 35 and 36 are substantially unobstructed and that there is even less obstruction to vision through the antenna structure than is the case with the structure of Figure 1.

Instead of depending upon an adhesive to hold the coil 42 in position between the plates 35 and 36, a third plate 43 of transparent material may be positioned between the plates 35 and 36 as shown in Figure 7, so as to be coextensive with the window portion 41 and form an inner support or spool for the conductors of the coil 42. This enables the antenna structure to be easily fabricated by first securing the plates 35, 36 and 43 together by an adhesive or otherwise and then winding the conductor of the coil 42 between the plates 35 and 36. As shown in Figure 8, a similar spool may be formed by employing a ring 44 preferably of transparent material and positioned interiorly of the antenna coil 42. The ring 44 may extend completely around the periphery of the window portion, but as shown in Figure 9 the inner support need not be a complete ring but may comprise a plurality of segments 45 of any desired shape. Figure 9 also illustrates a suitable arrangement for enabling the flexible connector leading from the antenna to the set to be detachably connected to the antenna. For example, a pair of pin jacks 45' for receiving suitable pins connected to the conductors in the flexible connector may be secured to the antenna structure and connected to the coil 42.

By employing properly formed plates 46 having peripheral recesses 48 as shown in Figure 10, an inner transparent support or spool portion 49 may be provided for the antenna coil. Two plates only are required for this construction. Figure 10 also illustrates the antenna adhesively secured to the surface of a window pane 47 to provide a permanent installation. The conductors of the coil 42 may be completely embedded in a single plate 50 of transparent material as shown in Figure 11 by casting or molding such material around a previously formed coil. It is apparent that any of the structures disclosed in Figures 7 to 11 may also be provided with the attaching means illustrated in Figures 1 to 6 for quickly attaching the antenna structure to a supporting surface or detaching the antenna from such surface, or that the attaching means of Figures 1 to 7 may be omitted and the antenna structure permanently attached by an adhesive or otherwise to a supporting structure as illustrated in Figure 10.

In the structure of Figure 5, it is apparent that the window portions 41 of the plates supporting the coil 42 may be cut out so as to decrease the weight of the antenna structure and also to further decrease impairment of vision through the antenna structure. An antenna structure having the center portion omitted is shown in Figure 12 and may comprise plates 51 having a central opening 52 coextensive with the opening in the coil 42. The coil 42 may be positioned between the plates 51 and secured by adhesives or otherwise. As shown in Figure 13, a ring 53 may be employed as a support for the coil 42 and also to provide more efficient means for securing the plates 54 together. Also, as shown in Figure 14, plates 55 having peripheral recesses 56 and openings 57 therethrough may be employed to provide a support for the coil in a manner similar to that shown in Figure 10. Furthermore, a flat tubular structure of insulating material 58 enclosing the coil 42 may be employed to support the coil. Such a tube may be fabricated about a preformed coil, for example, by molding plastic material therearound or by wrapping the coil with an impregnated tape and solidifying the same, for example by drying or with heat and pressure.

When the center portion of the antenna structure is thus removed, it is further apparent that the plates or other supporting structure may even be made of translucent or opaque insulating material without seriously impeding vision through the antenna, as the coil 42 is itself opaque. Furthermore, if the antenna structures of Figures 12 to 15 are to be permanently secured in a desired position, the vacuum cups of either the structures of Figure 1 or Figure 5 with their associated supporting members may be omitted and the remaining antenna structure adhesively or otherwise permanently attached to a supporting surface in a manner similar to that described with reference to Figures 7 to 11. Thus, antenna structures having transparent center portions or cut out center portions may be glued to glass of an automobile window or windshield, or similar closure for openings in other shielding structures.

Also, it is possible to incorporate the coil of the antenna between the layers of laminated glasses such as so-called "safety glass." For example, the coil of the antenna can be mounted between the glass laminations of the ventilating door window employed in many automobiles, other door windows, windshield or rear window of an automobile. The coil may occupy a corner or end of a window or windshield or may extend around the periphery thereof. Similar structures may be employed for windows in boats, airplanes, buildings, etc.

An example of such a structure is illustrated in Figure 16, in which a pane of laminated glass is shown with an antenna coil 59 positioned therein preferably between the glass laminations. The glass 58 may be employed as a window closure in a shielding or other structure and the coil 59 does not materially obstruct vision or transmission of light through such window. The conductors 60 for connecting the antenna to a radio set are shown as merely projecting from the edge of the pane of glass, but any desired type of detachable connector, for example the pin jacks of Figure 9, may be secured to the glass 58 or the support for the glass so that a connecting element carried by the radio set may serve to detachably connect the set to the antenna coil 59. In all of the structures described, a rigid antenna panel structure is provided such that variations in reception are not caused by relative movement between portions of the antenna structure, and obstruction of vision is minimized.

As indicated above, the transparent material forming a support for the conductor of the antenna may be relatively thin plates of glass between which the conductors are secured. For antennas which are intended to be moved from place to place, it is preferable to form the transparent plates of less frangible material such as any of the transparent plastics now available commercially. For example, transparent sheets of synthetic resins such as phenolic condensation or similar condensation products may be employed. Also, sheets of various cellulose derivatives or regenerated cellulose, for example, cellulose acetate, are suitable. Various other materials having similar properties may be employed. As also described above, instead of employing a sheet of supporting material upon each side of the antenna coil, the conductors of the coil may be embedded in the body or surface of a single plate of transparent insulating material, for example, by first forming an antenna coil and then molding or casting the insulating material about the coil so that the conductors are positioned entirely within the body of the insulating material or are sufficiently embedded in the surface to be rigidly held in position. If either the separate plates of insulating material with the conductors positioned between the plates or an integral structure with the conductors embedded in a single panel of material is employed, the supporting material for the coils should be of sufficient thickness to provide a relatively rigid panel structure, particularly when suction cup or similar attaching means are secured to the supporting material in a manner similar to that shown in the drawings. When the center portion of the supporting material is omitted as in Figures 12 to 15, it is apparent that supporting materials similar to those discussed above can be employed either as separate plates or with the conductors embedded in a single plate, but that the supporting material need not necessarily be transparent. When the supporting structure is, thus, not required to be transparent, less expensive materials such as fiber board or impregnated paper or cardboard can be satisfactorily employed. In general, the supporting material should be an insulator and is preferably of a type which produces low dielectric losses so that substantially all of the signal energy impressed upon the antenna structure is delivered to the set. Also, by positioning the conductors of the loop antenna either between plates of the type of insulating material above discussed or by embedding the conductors directly in a panel of such material, the antenna is less affected by moisture or climatic conditions.

In Figures 17 and 18, one suitable means is shown for combining an antenna structure such as those shown in Figures 1 to 6 with a portable radio receiver. In accordance with these figures, a compartment 61 provided with a closure such as a door 62 is positioned in one end of the casing 63 of the radio set. The casing 63 may also provide a compartment 64 for the set chassis (not shown) and a compartment 65 for a battery (not shown). The door 62, shown in Figure 18, is not shown in Figure 17 in order to more clearly illustrate the disposition of the antenna in the compartment 61.

Many portable receivers are provided with a circuit enabling the set to also be plugged in to a power line for operation therefrom in order to conserve the batteries. The compartment 61 may also serve as a convenient storage place for the flexible connector 66 for connecting the set to a power line. That is to say, the connector 66 may be coiled upon brackets 67 secured to the real wall 68 of the compartment when not in use. The flexible connector 30 for the antenna structure 10 may be folded or wound around the antenna structure 10 and the entire antenna structure inserted within the compartment 61 as shown in Figure 17 and in dotted lines in Figure 18. A notch (not shown) may be provided in an edge of the door or other closure to enable the conductor 66 to extend exteriorly of the compartment 61 when the closure is in closed position.

During normal operation of the set a built-in antenna 69 may be connected to the set through the normally closed contacts 70 of the jack 33 and conductors 71. When it is desired to employ the antenna 10, for example, when the set is positioned within a shielding structure, the antenna 10 may be removed from the compartment 61 and positioned adjacent an opening in the shielding structure. The plug 32 attached to the flexible connector 30 may be inserted within the jack 33 to open the contacts 70 and at the same time complete a connection between the conductors 71 and the flexible conductors 28 and 29 of the flexible connector 30. It will thus be seen that I have provided a radio set which is not only operative by reason of a built-in antenna, but a receiver which may be rendered operative when positioned within a shielding structure by employing an auxiliary antenna structure which may be positioned in an opening in the shielding structure and which does not materially obstruct vision through such opening. It is also possible to omit the built-in antenna and employ the removable antenna for normal operation of the set by permanently connecting the removable antenna to the set so that signal energy is delivered to the set by the removable antenna when positioned in its compartment in the set casing.

This application is a division of my co-pending application Serial No. 298,302 filed October 6, 1939, now Patent 2,250,387 granted July 22, 1941.

While I have disclosed the preferred embodiments of my invention, it is understood that the details thereof may be varied within the scope of the following claims.

I claim:

1. A radio antenna for enhancing radio reception by a receiver positioned within a shielding structure of electrically conducting material having an opening of predetermined area therein, said antenna comprising a conductor forming a loop having an area enclosed thereby which is substantially smaller than half of the area of said opening, means for supporting said loop substantially in the plane of said opening and substantially off center with respect to the center of said opening, and means for transferring radio energy from said loop to said receiver.

2. A radio antenna for enhancing radio reception by a receiver positioned within a shielding structure of electrically conducting material having an opening of substantial area therein, comprising a panel of insulating material arranged to close said opening, a conductor forming a loop whose enclosed area is substantially less than one half the area of said opening, means for supporting said loop by said panel of insulating material in a position substantially off center with respect to the center of said opening, and means for transferring radio energy from said loop to said receiver.

3. A radio antenna for enhancing radio reception by a receiver positioned within a shielding structure of electrically conducting material having an opening of substantial area therein, comprising a transparent panel of insulating material arranged to close said opening, a conductor forming a loop whose enclosed area is substantially less than half the area of said opening, means for supporting said loop by said panel in a position off center with respect to the center of said opening, and means for transferring radio energy from said loop to said receiver.

EUGENE F. McDONALD, Jr.